(12) United States Patent
Jaquette et al.

(10) Patent No.: US 8,176,269 B2
(45) Date of Patent: May 8, 2012

(54) MANAGING METADATA FOR DATA BLOCKS USED IN A DEDUPLICATION SYSTEM

(75) Inventors: Glen Alan Jaquette, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 12/165,540

(22) Filed: Jun. 30, 2008

(65) Prior Publication Data

US 2009/0327625 A1 Dec. 31, 2009

(51) Int. Cl.
*G06F 12/00* (2006.01)

(52) U.S. Cl. ............ 711/156; 711/4; 711/100; 711/114; 711/161; 711/162; 711/157; 707/674; 707/675; 707/678; 707/679; 707/802; 707/803; 707/813; 707/814

(58) Field of Classification Search .............. 711/4, 114, 711/161–162, 156–157; 707/674–675, 678–679, 707/802–803, 813–814
See application file for complete search history.

(56) References Cited

U.S. PATENT DOCUMENTS

| | | | |
|---|---|---|---|
| 6,003,039 A | 12/1999 | Barry et al. | |
| 6,339,793 B1 | 1/2002 | Bostian et al. | |
| 7,593,950 B2 * | 9/2009 | Silverman et al. | 1/1 |
| 7,653,637 B2 * | 1/2010 | Thanu et al. | 709/215 |
| 2002/0099728 A1 * | 7/2002 | Lees et al. | 707/203 |
| 2005/0228954 A1 | 10/2005 | Factor et al. | |
| 2007/0083711 A1 | 4/2007 | Bradford et al. | |
| 2008/0005141 A1 * | 1/2008 | Zheng et al. | 707/101 |
| 2008/0098083 A1 * | 4/2008 | Shergill et al. | 709/217 |
| 2008/0155192 A1 * | 6/2008 | Iitsuka | 711/114 |

OTHER PUBLICATIONS

Application titled "Data Deduplication by Separating Data from Meta Data", U.S. Appl. No. 11/966,460, filed Dec. 28, 2007, by inventor M.J. Anglin.
Application titled "Method for Improving File Data De-duplication by Identifying and Separating File Data Streams within a File", U.S. Appl. No. 12/043,797, filed Mar. 6, 2008, by inventors A. Hochberg, J. Smith and M. Anglin.

* cited by examiner

*Primary Examiner* — Tuan Thai
*Assistant Examiner* — Zhuo Li
(74) *Attorney, Agent, or Firm* — David W. Victor; Konrad Raynes & Victor LLP

(57) ABSTRACT

Provided are a method, system, and article of manufacture for managing metadata for data blocks used in a deduplication system. File metadata is maintained for files having data blocks in a computer readable device. Data block metadata is maintained for each data block in the computer readable device. The data block metadata for one data block includes a data block reference and content identifier identifying content of the data block. The file metadata for each file includes the data block reference to each data block in the file. A determination is made of an unreferenced data block in the computer readable device that has become unreferenced. Indication is made that the data block metadata for the determined unreferenced data block as unreferenced metadata. The data block reference of the unreferenced metadata is maintained in the computer readable device in response to determining that a includes the data block indicated in the unreferenced metadata.

20 Claims, 7 Drawing Sheets

MANAGING METADATA FOR DATA BLOCKS USED IN A DEDUPLICATION SYSTEM

BACKGROUND OF THE INVENTION

1. Field of the Invention

The present invention relates to a method, system, and article of manufacture for managing metadata for data blocks used in a deduplication system

2. Description of the Related Art

Data deduplication (often called "intelligent compression" or "single-instance storage") is a method of reducing storage space used to store data by eliminating redundant data in files sharing common data. In deduplication systems, only one unique instance of the data is actually retained on storage media, such as disk or tape, and additional instances of the data in different files or databases may be replaced with a pointer to the unique data copy. Thus, if only a few bytes of a new file being added are different from data in other files, then only the new bytes are stored for the new file and pointers are included in the added file that reference the common data in other files or databases.

In a deduplication system, metadata for data blocks included in presently stored files include a hash value generated from the content of the data block. The data blocks subject to deduplication are usually at the subfile level. When adding a file comprised of data blocks, a hash may be applied to each data block to determine whether the hash of the data block in the file being added matches the hash value in metadata. If there is a match, the data block in the file is replaced with a pointer or reference to the metadata having the matching hash value.

In a deduplication system, metadata is maintained for each data block included in currently stored files, where the data block comprises a subfile element. When the file including the data block is removed and the metadata for a data block is not referenced in another file, then the metadata is removed.

FIG. 1 illustrates a system known in the art for storing data blocks and file metadata. A metadata storage stores file metadata, e.g., files F0 and F1, that lists a pointer, e.g., PA, PC, PE, PG, PH, PJ, PL, PN, for each data block included in a file, where the order of the data block pointers in the file metadata FO, F1 provides an ordered list of the data blocks in the file and the block sizes. The file metadata FO, F1 further includes the length of each data block LB, LD, LF, LH, LI, LK, LM, LO. A file data block storage stores the actual data blocks e.g., PA, PC, PE, PG, PH, PJ, PL, PN, that are referenced in file metadata in the metadata storage.

There is a need in the art for improved techniques for managing metadata used in deduplication.

SUMMARY

Provided are a method, system, and article of manufacture for managing metadata for data blocks used in a deduplication system. File metadata is maintained for files having data blocks in a computer readable storage device. Data block metadata is maintained for each data block in the computer readable storage device. The data block metadata for one data block includes a data block reference and content identifier identifying content of the data block. The file metadata for each file includes the data block reference to each data block in the file. A determination is made of an unreferenced data block in the computer readable storage device that has become unreferenced. Indication is made that the data block metadata for the determined unreferenced data block as unreferenced metadata. The data block reference of the unreferenced data block metadata is in the computer readable storage device is added to file metadata for an added file that includes the data block indicated in the unreferenced data block metadata.

DETAILED DESCRIPTION

Figure 1:
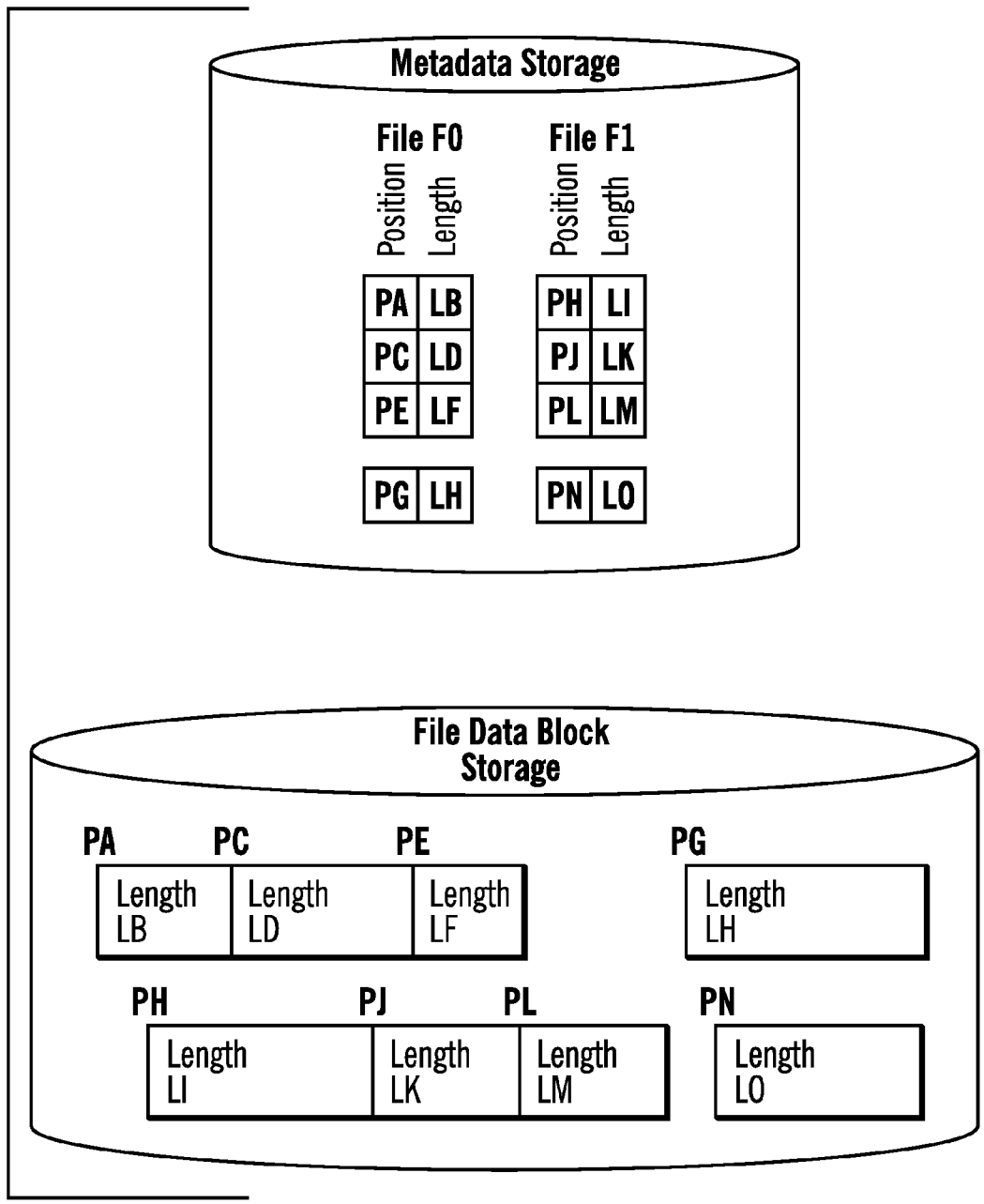
FIG. 1 illustrates an arrangement for storing data blocks and file metadata known in the prior art.
Figure 2:
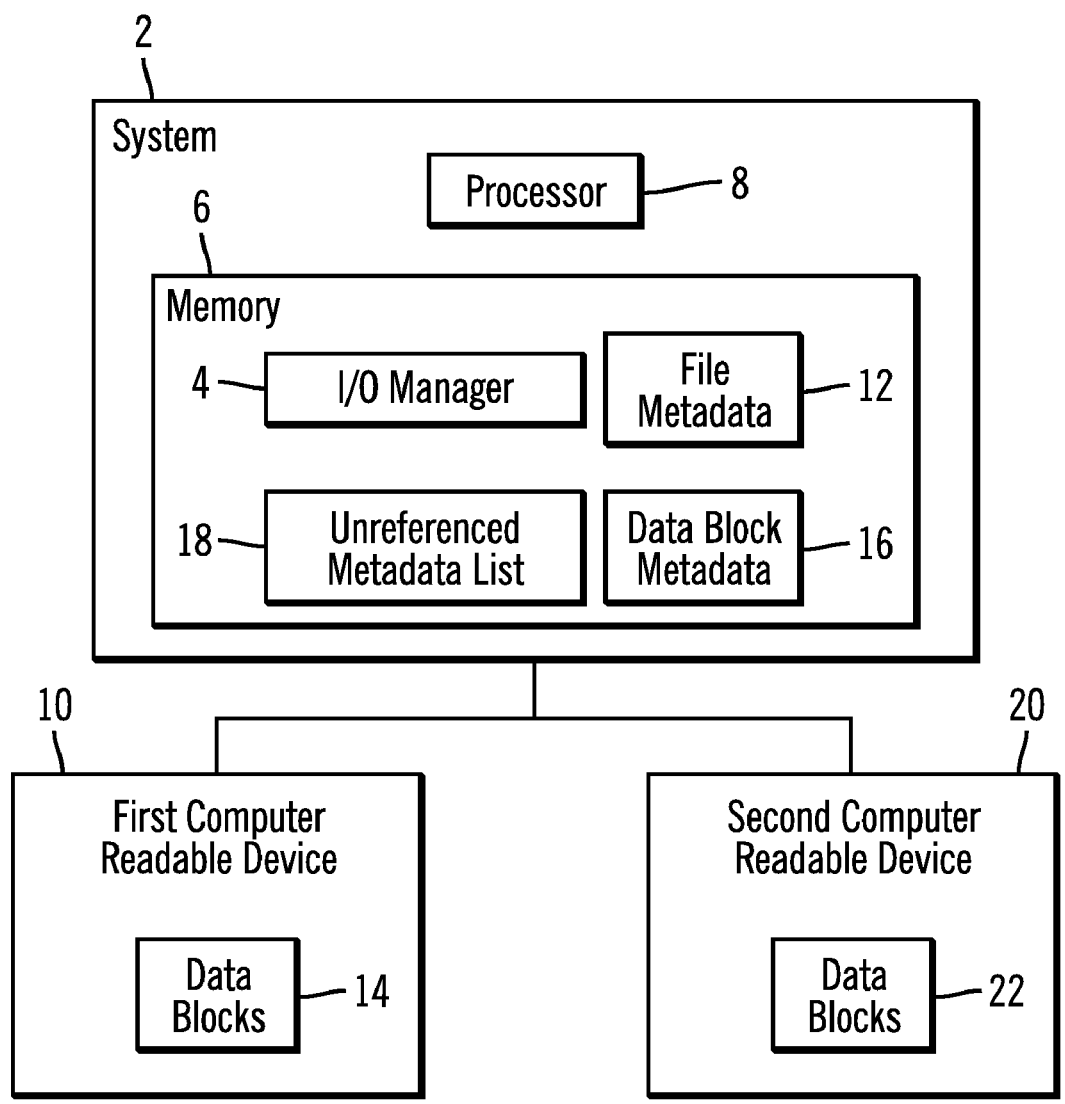
FIG. 2 illustrates an embodiment of a computing environment.

FIG. 2 illustrates an embodiment of a computing environment. A system 2 includes an Input/Output (I/O) manager 4 in a memory 6 that is executed by a processor 8. The I/O manager 4 manages I/O requests from applications (not shown) in one or more host systems (not shown) or in the system 2 to add, delete or update files. A file is defined in file metadata 12 that provides information on the data blocks 14 in the first computer readable device 10 that are included in a file. The I/O manager 4 further maintains data block metadata 16 for each data block included in the files defined in the file metadata 12, where the files may be comprised of one or more blocks of data. The I/O manager 4 may use the file 12 and block 16 metadata in deduplication operations, so that future added instances of a data block represented by the block metadata 16 includes a reference to a data block from a previous file instead of writing the data block to the first computer readable device 10 and referencing the newly written data in the file metadata 12

An unreferenced metadata list 18 indicates unreferenced data block metadata 16, which represents a data blocks 14 not referenced in one file metadata 12. In an alternative embodiment, other techniques may be used to indicate metadata 16 as unreferenced other than a list 18, such as a field or flag in the file metadata 12.

Data blocks 14 in files 12 in the first computer readable device 10 may be copied to the second computer readable device 20 as data blocks files 20 and, optionally, unreferenced data blocks may be copied when removed from the first computer readable device 10.

The first 10 and second 20 computer readable devices may each comprise suitable storage devices known in the art, such as a single hard disk drive, an array of storage devices, such as a Just a Bunch of Disks (JBOD), Direct Access Storage Device (DASD), Redundant Array of Independent Disks (RAID) array, virtualization device, magnetic tape storage, flash memory, electronic memory, etc. In one embodiment, the first computer readable device 10 may comprise a faster access storage device, such as hard disk drives, than the second computer readable device 20, which may provide tape backup for the first computer readable device 20. In an additional embodiment, the first computer readable device may comprise an array of hard disk drives functioning as a cache for files stored in the second computer readable device 20, which may comprise a tape, such that the first computer readable device 10 operates as a virtual tape cache for the second device 20. In this way, the first 10 and second 20 computer readable devices may be part of a hierarchical storage management system. Data blocks 14 may be moved from the first 10 to the second 20 computer readable devices as part of a file retention or archival policy to make space available in the first computer readable device 10. The system 2 may comprise any system suited for managing I/O requests directed to storage devices 10, 20, such a storage controller, server, enterprise storage server (ESS), etc.

The file metadata 12, data block metadata 16 and unreferenced metadata list 18 may alternately be stored in first computer readable device 10, second computer readable device 20, or a third computer readable device (not shown).

The system 2 may communicate with the first 10 and second 20 computer readable devices over an internal bus, cables, Small Computer System Interface (SCSI) connection, or a network (e.g., a Storage Area Network (SAN), Local Area Network (LAN), Intranet, the Internet, Wide Area Network (WAN), peer-to-peer network, wireless network, arbitrated loop network, etc.).

Figure 3:
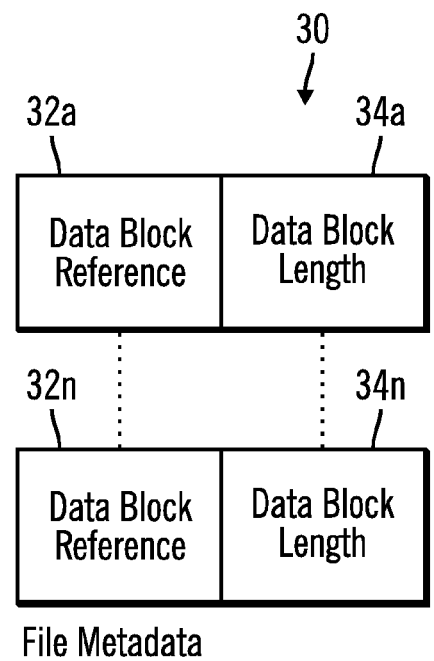
FIG. 3 illustrates an embodiment of file metadata.

FIG. 3 illustrates an embodiment of file metadata 30 providing for each file an ordered list of one or more references 32a . . . 32n to data blocks in the file in the order in which the data blocks appear in the file 30 and a data block length 34a . . . 34n indicating a byte length of the data block. The file metadata 30 comprises an instance of the file metadata 12 for a specific file.

Figure 4:
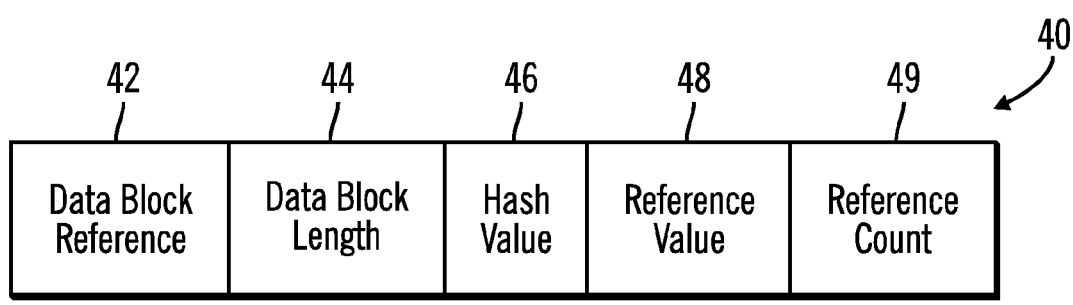
FIG. 4 illustrates an embodiment of data block metadata.

FIG. 4 illustrates an embodiment of data block metadata 40 maintained for each data block 14 including a data block reference 42 comprising an address or a pointer to the data block 14 in the first computer readable device 10; a data block length 44 comprising the byte length of the data block; a hash value 46 comprising a value resulting from a hash function applied to the data block; a reference value 48 comprising a timestamp, such as time last written, last read, or when reference count went to zero, etc. There may be one reference value for each file 12 referencing the data block 14; and a reference count 49 comprising the number of files 12 referencing the data block 14. A data block is unreferenced if the reference count 49 is zero. The data block metadata 40 comprises an instance of the data block metadata 16 for a specific data block.

In certain embodiments, the data block metadata 40 may not include a hash value 46. If a hash value is not provided, then the algorithm may have to use a difference compare to determine whether the data block being added to a file matches the referenced data block stored in the data block storage 52. In certain embodiments, the reference value Vz, Vw, Vx, Vy, Ve may comprise an aggregate value based on the value with respect to each of the files referencing the data block, such as a n average or maximum calculated value associated with the block.

Figure 5:
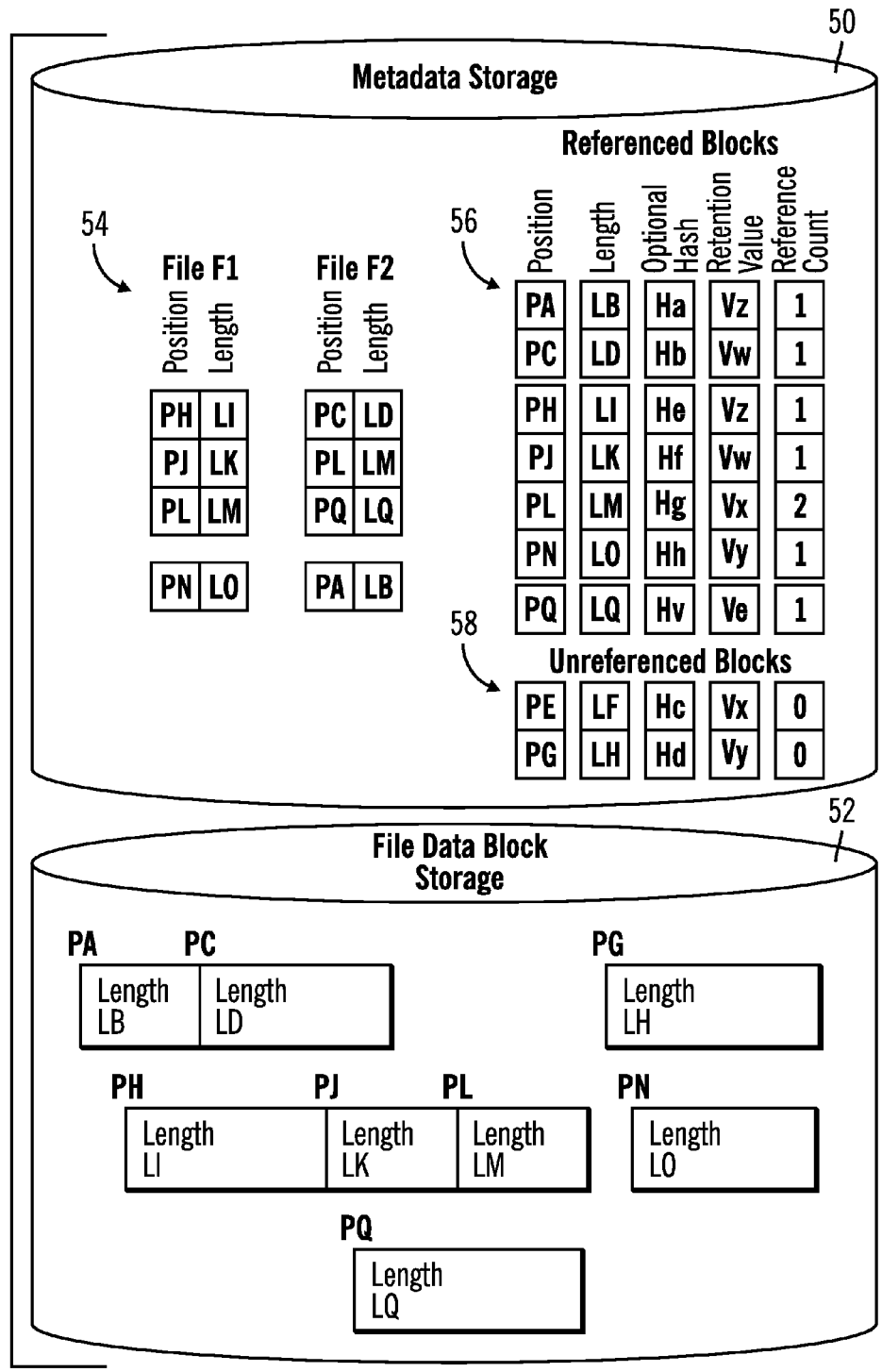
FIG. 5 illustrates an example of a metadata storage and file data block storage having the file metadata and data block metadata.

FIG. 5 illustrates an embodiment of a metadata storage 50, such as the memory 6, and a data block storage 52, such as the first computer readable device 10. The metadata storage 50 includes file metadata 54 FI, F2, such as file metadata 30, that includes an ordered list of pointers PH, PJ, PL, PN and PC, PL, PQ, PA to data blocks stored in the storage 52 included in the files F1, F2 and the lengths LI, LK, LM, LO, LD, LM, LQ, LB of the data blocks. The metadata storage 50 further includes referenced block metadata 56, e.g., block metadata 40, that provides information for each data block PA, PC, PH, PJ, PL, PN, PQ referenced in a file F1, F2. The referenced block metadata 40 for each data block includes the data block reference 42, e.g., PA, PC, PH, PJ, PL, PN, PQ, a length 44, e.g., LB, LD, LI, LK, LM, LO, LQ, of the data block, a hash value 46, e.g., HA, Hb, He, Hf, Hg, Hh, Hv of the current version of the data block, a reference value 48, e.g., Vz, Vw, Vw, Vx, Vy, Ve indicating a timestamp of the time the data block was last updated, last read, or last time the count of number of file references to the block went to zero, etc. Each data block entry in the referenced blocks 56 may include a separate reference value Vz, Vw, Vw, Vx, Vy, Ve for each file, e.g., F1, F2, referencing that data block, indicating the time that data block was updated, read or attained the state indicated by the reference value. The referenced block metadata 56 may further indicate for each data block a reference count 49 indicating the number of current references to the data block PA, PC, PH, PJ, PL, PN, PQ.

The metadata storage 50 includes unreferenced block metadata 58 comprising data blocks maintained in the data block storage 52 that are not referenced by any file, e.g., F1, F2, which would have a reference count 49 of zero. For each unreferenced data block, e.g., PE, PG, the unreferenced block metadata 58 indicates the identifier or pointer of the unreferenced data block, e.g., PE, PG, the length of the data block, e.g., LF, LH, a hash value HC, HD calculated by applying a hash value to the contents of the data block, the reference value, e.g., Vx, VY, indicating a timestamp of a last state change of the data block, and a reference count, which is zero for unreferenced data blocks indicating that the data blocks are not referenced in a file, e.g., F1, F2.

Figure 6:
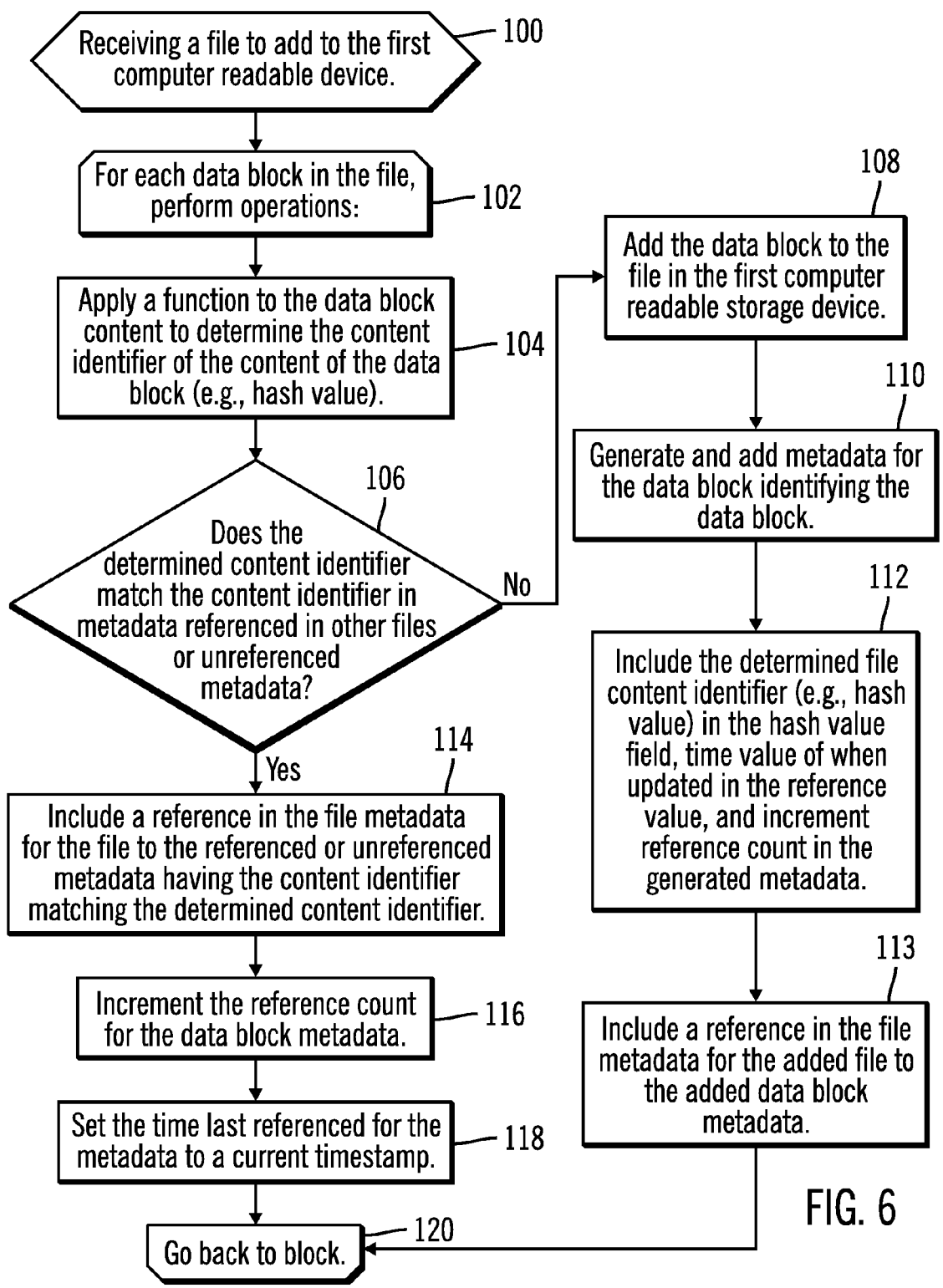
FIG. 6 illustrates an embodiment of operations to add a file to a computer readable storage device.

FIG. 6 illustrates an embodiment of operations performed by the I/O manager 4 to add a file to the first computer readable device 10. Upon receiving (at block 100) a new file having one or more data blocks to add to the first computer readable device 10, the I/O manager 4 performs operations at blocks 104 through 118 for each data block in the received file. The I/O manager 4 applies (at block 104) a function to the data block content to determine a file content identifier, such as a hash value, of the content of the data block. A determination is made (at block 106) whether the determined content identifier matches the hash value 46 in the data block metadata 40 for an existing data block in the data block metadata 16 referenced in other files 12 or an unreferenced data block (i.e., where the metadata 40 for the data block indicates that the data block is not referenced in any file, e.g., the reference count 49 is zero or the data block is listed in the unreferenced metadata list 18). If hash values are not provided, then the I/O manager 4 may have to compare the data block to add to the existing data blocks to locate a match. If (at block 106) there is no match, then the I/O manager 4 adds (at block 108) the full data block of the file 12 to add to the first computer readable device 10 as a data block 14 and generates and adds (at block 110) metadata 40 (FIG. 3) for the data block referencing the added data block in the first computer readable device 10. The I/O manager 4 includes (at block 112) the determined file content identifier (e.g., hash value) in the hash value field 46, time value of when the data block was added in the reference value 48, and increments the reference count 49 in the generated metadata 40. The reference value 48 may be set to a current time when the data block was added and first referenced in file metadata 12. The I/O manager 4 includes (at block 113) a reference to the data block 32a . . . 32n in the file metadata 30 for the added file, which matches the data block reference 42 in the added data block metadata 40.

If (at block 106) there is a match of the determined content identifier, e.g., hash value, and the hash value 46 file in one referenced or unreferenced data block metadata 40 in the data block metadata 16, then the I/O manager 4 includes (at bock 114) a reference in the file metadata 12 for the added file to the referenced or unreferenced data block having a hash value 46 matching the determined content identifier. The reference count 49 for the data block is incremented (at block 116) If the data block metadata 40 having the matching hash value 46 is unreferenced metadata, such as having a reference count 49 of zero or otherwise indicated, then the indication of the referenced metadata as unreferenced is removed by incrementing the reference count 49. Further, the indication of metadata as unreferenced may be removed by removing the data block reference from the unreferenced metadata list 18 and updating the time last referenced in the reference value 48 for the referenced metadata, or by performing some other operation to indicate that the referenced metadata is no longer unreferenced. The I/O manager 4 further sets (at block 118) the time last referenced 68 for the metadata 60 to which the reference is added to a current timestamp. From block 113 or 118, control proceeds to block 120 to process any further data blocks in the file being added.

With the described embodiments, the hash or difference operation requires the actual data block to be at a referenced location. This may be accomplished by maintaining both the unreferenced metadata and the associated data block associated.

Figure 7:
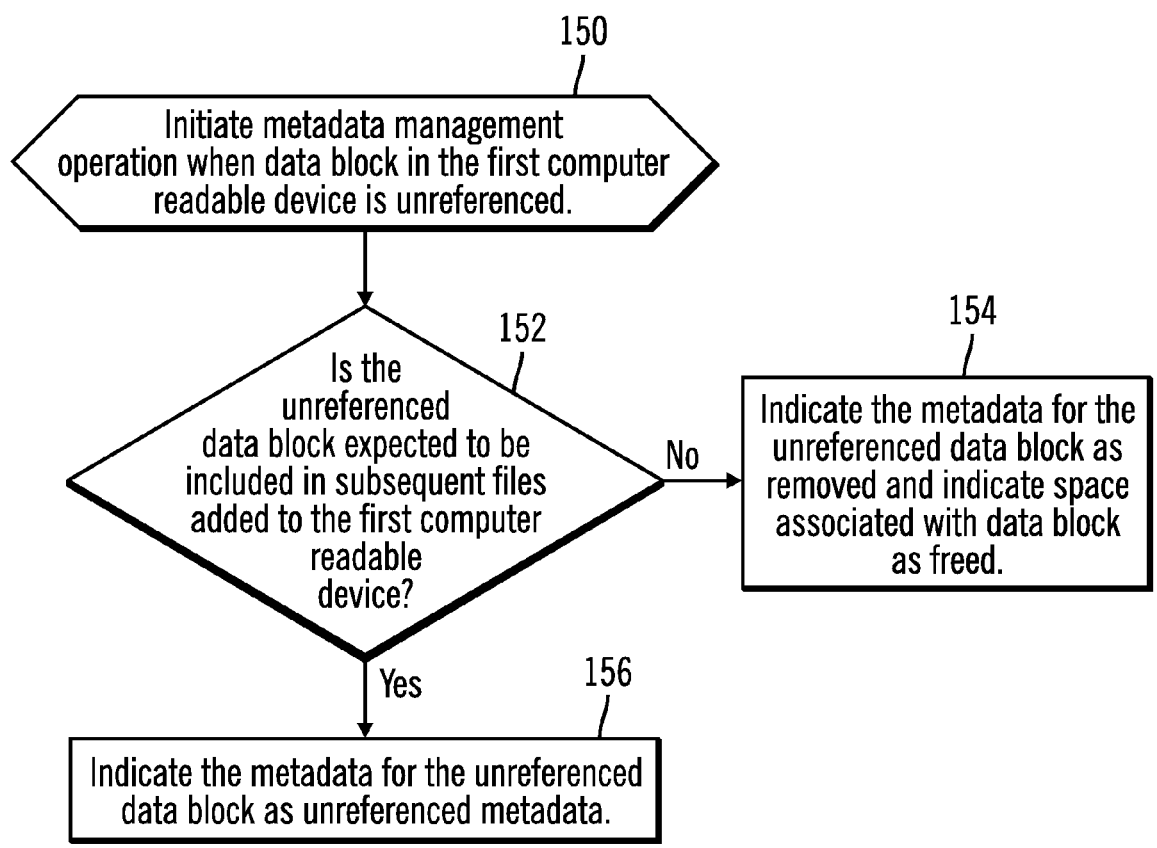
FIG. 7 illustrates an embodiment of operations to manage metadata for a data block that becomes unreferenced in the computer readable storage device.

FIG. 7 illustrates an embodiment of metadata management operations performed by the I/O manager 4 when a data block 14 in the first computer readable device 10 becomes unreferenced. The operations of FIG. 7 may be initiated when the file metadata 12 referencing the data block 32a . . . 32n is removed from the file metadata 12, such as when the file represented by the file metadata 12 is deleted. A data block may become unreferenced when no file includes a reference to the data block. Further, the file metadata 12 including the data block content or the data block content for the unreferenced data block may be moved to the second computer readable storage device 20. Upon determining that a data block 14 is unreferenced (at block 150), a determination is made (at block 152) whether the unreferenced data block is expected to be included in subsequent files added to the first computer readable device 10. If not, then the data block metadata 40 for the unreferenced data block is also removed (at block 154), or indicated as removed, and the space associated with the removed data block is freed. Otherwise, if the unreferenced data block is expected to be included in a subsequent added file, then the data block metadata 40 for the unreferenced data block is indicated (at block 156) as unreferenced, such as by setting the reference count 49 for the data block 14 to zero and/or adding a reference to the data block to the unreferenced metadata list 18. In this way, the data block metadata 40 for the unreferenced data block is retained to use in deduplication operations and be referenced when the data block represented by the unreferenced metadata 40 is moved to the second computer readable device 20. Copies of metadata 40 may be maintained in the system memory 6, first computer readable device 10 and/or second computer readable device 20.

In an alternative embodiment, the metadata 60 may be indicated as unreferenced in response to removing the data block from the first computer readable device 10 without a determination of whether the data block is likely to be subsequently referenced. Further, files or data blocks may be moved from the first 10 to the second 20 computer readable devices as part of an algorithm, such as a least recently used (LRU) algorithm, to create space in the first computer readable device 10 for further files 12. Files and data blocks may be moved to the second computer readable device 20 when the first computer readable device 10 operates as a cache for the second computer readable device 20.

Figure 8:
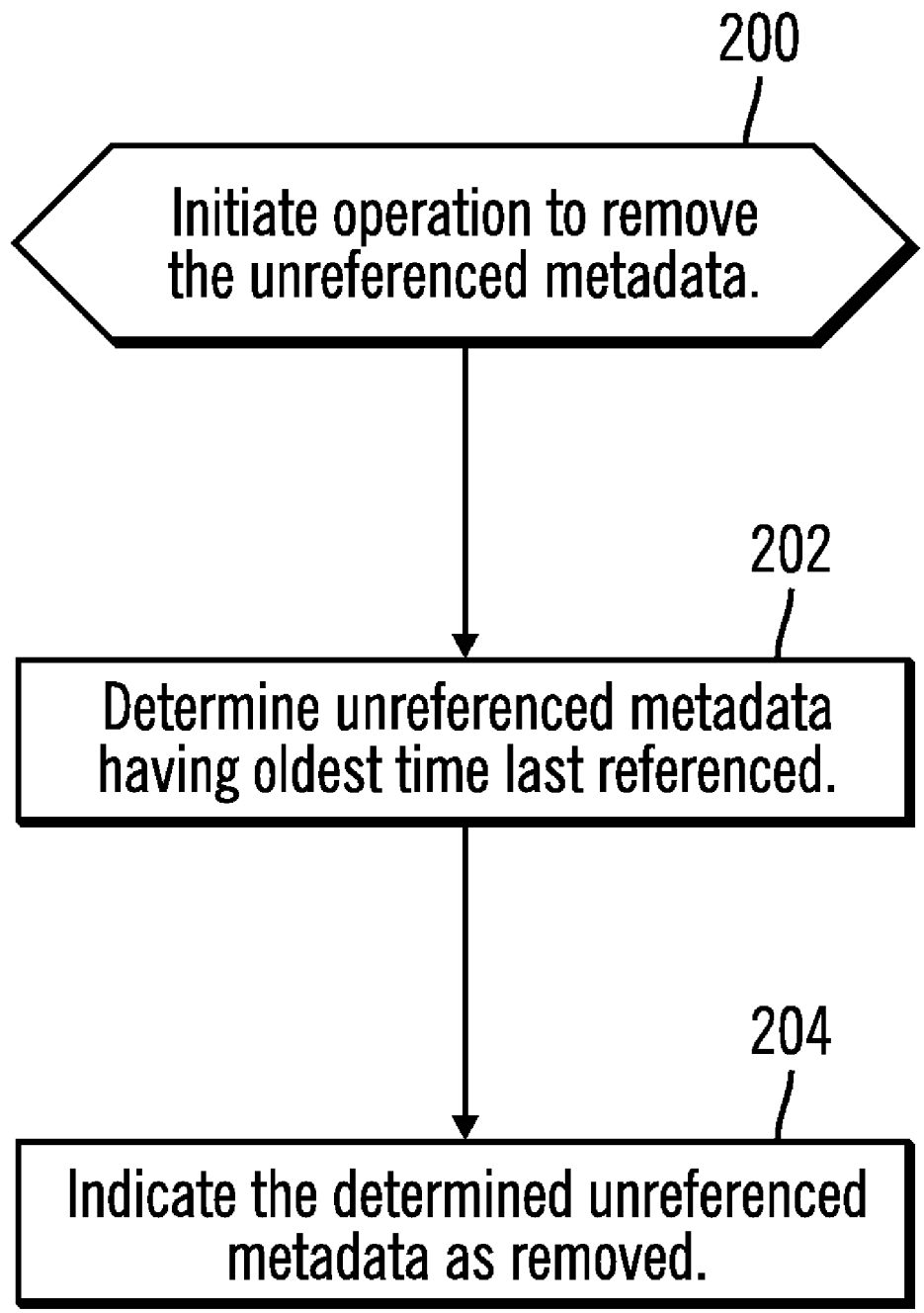
FIG. 8 illustrates an embodiment of operations to remove unreferenced metadata form the computer readable device.

FIG. 8 illustrates an embodiment of operations to remove unreferenced metadata 40. This operation may be performed to make room for additional metadata 40 or additional data blocks 14, especially as unreferenced data block and their metadata continue to accumulate in the computer readable device 10. The unreferenced metadata 40 may be removed from the memory 6, first computer readable device 10 and/or second computer readable device 20 where the metadata is stored. When the data block metadata 16 referencing a particular data block 14 is removed, then the space in the first computer readable device 10 may be freed to store additional, new data blocks. Upon initiating (at block 200) the operation to remove unreferenced metadata 40, the I/O manager 4 determines (at block 202) the unreferenced metadata 40 having the oldest time last referenced 48, i.e., the unreferenced metadata not referenced for the longest time period. Further, the determined unreferenced metadata may comprise metadata having no value for the time last referenced 48, indicating that the metadata 40 for the data block was never referenced in a file 12. The I/O manager 4 indicates (at block 204) the unreferenced metadata as removed.

In a further embodiment, unreferenced metadata may be removed in response to determining that the data block the unreferenced metadata represents is removed from the second computer readable device 20, which may occur if the file 12 including a reference to the data block 22 in the second computer readable device 20 is removed. Other techniques may also be used to determine whether unreferenced metadata should be removed. For instance, unreferenced metadata may be removed in response to removing a data block from the first computer readable device 10 that is unlikely to be referenced in a file subsequently added.

Described embodiments provide techniques to determine whether to retain metadata for a data block in a storage device as part of deduplication when the data block represented becomes unreferenced, which may occur when the data block is removed from the storage, such as when moving the file including the data block from a first computer readable device 10 to a second computer readable device 20 as part of a file retention or archival policy.

In certain embodiments, the deduplicating storage device may be part of a hierarchical storage subsystem where the deduplicating storage comprises a cache for a larger backstore. One example of this is a virtual tape subsystem where the deduplicating storage is a disk cache for the virtual tape subsystem and the majority of the data stored is on physical tape. In that case, data flows through the deduplicating storage and resides in that deduplicating storage for only a temporary period of time. With described embodiments, the metadata may be stored and used for deduplicating data on tape for some period of time after data has been transferred from the deduplicating storage onto tape. This provides the ability of the deduplicating storage to deduplicate data that is recalled into cache and maintained on tape, or deduplicating similar data written at a later point in time.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In the described embodiments, the I/O manager 4 code executed by a processor 8. In an alternative embodiment, the I/O manager may be implemented in a chipset or hardware that is separate from the main system processor 8, such as the processor that executes applications in the system 2.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining file metadata for files having data blocks in a computer readable storage device, wherein at least one of the files has file metadata indicating that the file has multiple data blocks;
   maintaining data block metadata for each data block in the computer readable storage device, wherein the data block metadata for one data block includes a data block reference and content identifier identifying content of the data block, wherein the file metadata for each file includes the data block reference to each data block in the file;
   determining an unreferenced data block in the computer readable storage device that has become unreferenced;
   indicating the data block metadata for the determined unreferenced data block as unreferenced data block metadata; and
   adding the data block reference of the unreferenced data block metadata in the computer readable storage device to file metadata for an added file that includes multiple data blocks including one data block having content matching the content of the unreferenced data block according to the content identifier in the unreferenced data block metadata.

2. The method of claim 1, further comprising:
   removing indication of the unreferenced data block metadata for the unreferenced data block as unreferenced in response to referencing the data block represented by the unreferenced data block metadata in the file metadata for the added file;

determining whether to remove the unreferenced data block metadata; and indicating the unreferenced data block metadata as removed in response to the determining to remove the unreferenced data block metadata.

3. The method of claim 2, wherein the data block metadata for the data blocks include a timestamp indicating when the data block reference for the data block metadata was most recently referenced in one added file, wherein determining whether to remove the unreferenced data block metadata comprises:

determining unreferenced data block metadata having an oldest timestamp, wherein the unreferenced data block metadata having the oldest timestamp is indicated as removed.

4. The method of claim 1, further comprising:

receiving a file to add having at least one data block;

for each data block in the file to add, performing:

applying a function to the data block content to determine a content identifier of the content of the data block;

determining whether the determined content identifier matches the content identifier in one data block metadata for a data block that is referenced in other files or is unreferenced;

including the data block reference for the data block in file metadata for the file to add in response to determining that no referenced data block metadata and no unreferenced data block metadata includes the content identifier matching the determined content identifier; and including, in the file metadata for the file to add, the data block reference to the data block whose data block metadata has the content identifier matching the determined content identifier.

5. The method of claim 1, wherein the computer readable storage device comprises a first computer readable device, further comprising:

copying the unreferenced data block to a second computer readable storage device.

6. The method of claim 5, further comprising:

determining one data block in the second computer readable storage device that is removed from the second computer readable storage device;

removing the unreferenced data block metadata for the determined data block in response to determining the removal of the data block from the second computer readable storage device.

7. The method of claim 1, further comprising:

determining whether the unreferenced data block is not expected to be included in subsequent files added to the computer readable storage device, wherein the indicating of the data block metadata for the unreferenced data block indicated as unreferenced is performed in response to determining that the unreferenced data block is expected to be included in the subsequent files; and indicating the data block metadata for the unreferenced data block as removed from the computer readable storage device in response to determining that the unreferenced data block is not expected to be included in the subsequent files.

8. A system in communication with a computer readable storage device, comprising:

an Input/Output (I/O) manager executed to perform operations, the operations comprising:

maintaining file metadata for files having data blocks in the computer readable storage device, wherein at least one of the files has file metadata indicating that the file has multiple data blocks;

maintaining data block metadata for each data block in the computer readable storage device, wherein the data block metadata for one data block includes a data block reference and content identifier identifying content of the data block, wherein the file metadata for each file includes the data block reference to each data block in the file;

determining an unreferenced data block in the computer readable storage device that has become unreferenced;

indicating the data block metadata for the determined unreferenced data block as unreferenced data block metadata; and adding the data block reference of the unreferenced data block metadata in the computer readable storage device to file metadata for an added file that includes multiple data blocks including one data block having content matching the content of the unreferenced data block according to the content identifier indicated in the unreferenced data block metadata.

9. The system of claim 8, wherein the operations further comprise:

removing indication of the unreferenced data block metadata for the unreferenced data block as unreferenced in response to referencing the data block represented by the unreferenced data block metadata in the file metadata for the added file;

determining whether to remove the unreferenced data block metadata; and indicating the unreferenced data block metadata as removed in response to the determining to remove the unreferenced data block metadata.

10. The system of claim 8, wherein the operations further comprise:

receiving a file to add having at least one data block;

for each data block in the file to add, performing:

applying a function to the data block content to determine a content identifier of the content of the data block;

determining whether the determined content identifier matches the content identifier in one data block metadata for a data block that is referenced in other files or is unreferenced;

including the data block reference for the data block in file metadata for the file to add in response to determining that no referenced data block metadata and no unreferenced data block metadata includes the content identifier matching the determined content identifier; and including, in the file metadata for the file to add, the data block reference to the data block whose data block metadata has the content identifier matching the determined content identifier.

11. The system of claim 8, wherein the computer readable storage device comprises a first computer readable storage device, wherein the operations further comprise:

copying the unreferenced data block to a second computer readable storage device.

12. The system of claim 11, wherein the operations further comprise:

determining one data block in the second computer readable storage device that is removed from the second computer readable storage device;

removing the unreferenced data block metadata for the determined data block in response to determining the removal of the data block from the second computer readable storage device.

13. The system of claim 8, wherein the operations further comprise:

determining whether the unreferenced data block is not expected to be included in subsequent files added to the computer readable storage device, wherein the indicating of the data block metadata for the unreferenced data block indicated as unreferenced is performed in response to determining that the unreferenced data block is expected to be included in the subsequent files; and indicating the data block metadata for the unreferenced data block as removed from the computer readable storage device in response to determining that the unreferenced data block is not expected to be included in the subsequent files.

14. An article of manufacture comprising a computer readable storage media including code executed to communicate with a computer readable device and to perform operations, the operations comprising:

maintaining file metadata for files having data blocks in the computer readable device, wherein at least one of the files has file metadata indicating that the file has multiple data blocks;

maintaining data block metadata for each data block in the computer readable device, wherein the data block metadata for one data block includes a data block reference and content identifier identifying content of the data block, wherein the file metadata for each file includes the data block reference to each data block in the file;

determining an unreferenced data block in the computer readable storage device that has become unreferenced;

indicating the data block metadata for the determined unreferenced data block as unreferenced data block metadata; and adding the data block reference of the unreferenced data block metadata in the computer readable storage device to file metadata for an added file that includes multiple data blocks including one data block having content matching the content of the unreferenced data block according to the content identifier indicated in the unreferenced data block metadata.

15. The article of manufacture of claim 14, further comprising:

removing indication of data block metadata for the unreferenced data block as unreferenced in response to referencing the data block represented by the unreferenced data block metadata in the file metadata for the added file;

determining whether to remove the unreferenced data block metadata; and indicating the unreferenced data block metadata as removed in response to the determining to remove the unreferenced data block metadata.

16. The article of manufacture of claim 15, wherein the data block metadata for the data blocks include a timestamp indicating when the data block reference for the data block metadata was most recently referenced in one added file, wherein determining whether to remove the unreferenced data block metadata comprises:

determining unreferenced data block metadata having an oldest timestamp, wherein the unreferenced data block metadata having the oldest timestamp is indicated as removed.

17. The article of manufacture of claim 14, further comprising:

receiving a file to add having at least one data block;

for each data block in the file to add, performing:

applying a function to the data block content to determine a content identifier of the content of the data block;

determining whether the determined content identifier matches the content identifier in one data block metadata for a data block that is referenced in other files or is unreferenced;

including the data block reference for the data block in file metadata for the file to add in response to determining that no referenced data block metadata and no unreferenced data block metadata includes the content identifier matching the determined content identifier; and including, in the file metadata for the file to add, the data block reference to the data block whose data block metadata has the content identifier matching the determined content identifier.

18. The article of manufacture of claim 14, wherein the computer readable storage device comprises a first computer readable storage device, further comprising:

copying the unreferenced data block to a second computer readable storage device.

19. The article of manufacture of claim 18, further comprising:

determining one data block in the second computer readable storage device that is removed from the second computer readable storage device;

removing the unreferenced data block metadata for the determined data block in response to determining the removal of the data block from the second computer readable storage device.

20. The article of manufacture of claim 14, further comprising:

determining whether the unreferenced data block is not expected to be included in subsequent files added to the computer readable storage device, wherein the indicating of the data block metadata for the unreferenced data block indicated as unreferenced is performed in response to determining that the unreferenced data block is expected to be included in the subsequent files; and indicating the data block metadata for the unreferenced data block as removed from the computer readable device in response to determining that the unreferenced data block is not expected to be included in the subsequent files.

* * * * *